United States Patent
Lee et al.

(10) Patent No.: US 10,877,589 B2
(45) Date of Patent: Dec. 29, 2020

(54) TOUCH CONTROL DEVICE AND METHOD FOR CONTROLLING THE TOUCH CONTROL DEVICE

(71) Applicant: HYUNDAI MOTOR COMPANY, Seoul (KR)

(72) Inventors: Jong Bok Lee, Suwon-si (KR); Donghee Seok, Seoul (KR); Gideok Kwon, Seoul (KR); HeeJin Ro, Seoul (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 15/366,853

(22) Filed: Dec. 1, 2016

(65) Prior Publication Data

US 2018/0004342 A1  Jan. 4, 2018

(30) Foreign Application Priority Data

Jul. 4, 2016 (KR) .......................... 10-2016-0084286

(51) Int. Cl.
*G09G 1/00* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04103* (2013.01)

(58) Field of Classification Search
CPC ........ G06F 3/0418; G06F 3/041; G06F 3/044; G06F 3/0354; G06F 3/038; G06F 3/02; H03K 17/975
See application file for complete search history.

(56) References Cited

U.S. PATENT DOCUMENTS

| | | | | |
|---|---|---|---|---|
| 9,524,065 | B2* | 12/2016 | Kawano | G06F 3/044 |
| 2012/0160657 | A1* | 6/2012 | Mizushima | G01L 1/142 |
| | | | | 200/600 |
| 2014/0253518 | A1* | 9/2014 | Takano | G06F 3/0418 |
| | | | | 345/178 |
| 2014/0354305 | A1* | 12/2014 | Hanssen | H03K 17/9622 |
| | | | | 324/661 |
| 2017/0038801 | A1* | 2/2017 | Lee | G06F 1/1656 |

FOREIGN PATENT DOCUMENTS

| | | | | |
|---|---|---|---|---|
| JP | 2007-335374 A | 12/2007 | | |
| JP | 2007335374 | * 12/2007 | ............ | H01H 13/00 |
| JP | 2008-108557 A | 5/2008 | | |
| KR | 10-2008-0108899 A | 12/2008 | | |
| KR | 10-2008-0110477 A | 12/2008 | | |

* cited by examiner

*Primary Examiner* — Michael A Faragalla
(74) *Attorney, Agent, or Firm* — Morgan, Lewis & Bockius LLP

(57) ABSTRACT

A touch control device includes a button including a metal complex and having an electrode groove formed therein, a signal deliverer arranged in the electrode groove and including a conductive material, and a substrate having a receiver formed thereon for receiving a signal from the signal deliverer.

8 Claims, 9 Drawing Sheets

TOUCH CONTROL DEVICE AND METHOD FOR CONTROLLING THE TOUCH CONTROL DEVICE

CROSS-REFERENCE TO RELATED APPLICATION

This application claims the benefit of priority to Korean Patent Application No. 10-2016-0084286, filed on Jul. 4, 2016 with the Korean Intellectual Property Office, the disclosure of which is incorporated herein by reference in its entirety.

TECHNICAL FIELD

The present disclosure relates to input devices and method for controlling the touch input device, and more particularly, to a touch control device with electrodes installed through a laser process and method for controlling the same.

BACKGROUND

To implement a touch control device capable of being manipulated by touch, technologies including resistive, capacitive, surface acoustic wave and transmitter methods are used.

A touch control device using the capacitive method includes a type that forms crossing electrode patterns, and detects an input position by sensing a change in capacitance between the electrodes when an input means, such as a finger, comes into contact with the touch control device. Another type applies the same electric potential of a phase to both terminals of a transparent conductive film and detects an input position by sensing a small current that flows when a capacitance is formed by an input means, such as a finger coming into contact with or approaching the touch control device.

In general, the touch control device has a 2-panel layered structure in which a first panel, including a number of first metal patterns that electrically connect first sensing patterns arranged in the first direction, e.g., in the x-axis direction, to a sensor circuit for calculating positions of the first sensing patterns on a first substrate. A second panel is also included, and comprises a number of second metal patterns that electrically connect second sensing patterns arranged in the second direction, e.g., in the y-axis direction, to a sensor circuit for calculating the positions of the second sensing patterns are stuck together by an adhesive.

As a method for manufacturing the touch control device, a method using Indium Tin Oxide (ITO), which is a transparent electrode, a method using metal mesh, a method using a Flexible Printed Circuit Board (FPCB), or the like, to be applied to the touch panel are used.

However, these methods require multiple processing steps, making them complicated and expensive. Especially, the ITO-based manufacturing process uses rare-earth elements, and thus has a problem of increased product costs due to the valuable materials required.

In addition, the existing processes use an adhesion method, which makes the product vulnerable to external vibration, shocks or high heat. Accordingly, the processes decrease product durability and are hard to be used in devices exposed to vibration and high temperature.

SUMMARY

The present disclosure provides a touch control device with electrodes formed without using adhesion methods.

The present disclosure also provides a touch control device with both physical buttons and touch buttons used in a single structure.

The present disclosure also provides a method for controlling a touch control device, by which it is determined whether an input means has come into contact with the touch control device and whether a button of the touch control device has been pressed.

In accordance with one aspect of the present disclosure, a touch control device comprises a button including a metal complex and having an electrode groove formed therein; a signal deliverer arranged in the electrode groove and including a conductive material; and a substrate having a receiver formed thereon to receive a signal from the signal deliverer.

Also, the button comprises resin including one or more of Polycarbonate (PC), Polyamide (PA), and acrylonitrile-butadiene-styrene copolymer (ABS), and metal oxide including one or more of Mg, Cr, Cu, Ba, Fe, Ti, and Al.

Also, the button is formed to have a base including the metal complex coated on one face of resin, glass, or leather.

Also, the touch control device further comprises a controller for receiving information about capacitance between the signal deliverer and the receiver and determining input information.

Also, the controller is configured to determine whether an input means comes into contact with the button from the information about the capacitance between the signal deliverer and the receiver.

Also, the controller is configured to determine whether an input means approaches the button within a predetermined range from the information about the capacitance between the signal deliverer and the receiver.

Also, the controller is configured to determine whether the signal deliverer approaches the receiver within a predetermined range or comes into contact with the receiver from the information about the capacitance between the signal deliverer and the receiver.

Also, the button comprises a touch unit with which an input means comes into contact, and a connector extending from the touch unit toward the substrate, and the signal deliverer comprises a first signal deliverer arranged in the touch unit and a second signal deliverer arranged in the connector.

Also, the touch control device further comprises an elastic member placed between the connector and the substrate for applying elastic force to the button.

Also, the first signal deliverer is formed to enclose the surrounding of a connecting part of the connector on the bottom of the touch unit, and the second signal deliverer is formed to be connected to the first signal deliverer on one side and extending to the bottom of the connector along one face of the connector.

In accordance with another aspect of the present disclosure, a method for controlling a touch control device including a button having a signal deliverer, a substrate with a receiver arranged thereon for receiving information about capacitance from the signal deliverer, an elastic member lying between the button and the substrate, and a controller for analyzing the information of the receiver, wherein the button forms a touch unit with which an input means comes into contact and the button is pressed while supported by the elastic member. The method includes: determining whether an input means has come into contact with the touch control device based on the information about capacitance received by the receiver; representing an indication on an indicator to identify that the input means has made a contact if it is determined that the input means has made the contact; and executing a pre-stored instruction if it is determined that the input means has made the contact.

The method may further include determining whether the button has been pressed based on the information about capacitance received by the receiver.

The touch control device may further include a resistance member arranged below the button, and it is determined whether the button has been pressed based on the information about a current or voltage changing when the resistance member comes into contact with the receiver.

Determining whether an input means has come into contact with the touch control device may include determining whether the information about capacitance received by the receiver meets a predetermined first threshold, and determining whether the button has been pressed may include determining whether the information about capacitance received by the receiver meets a predetermined second threshold.

The method may further include determining whether an input means is approaching the touch control device based on the information about capacitance received by the receiver; and representing an indication on an indicator to identify that the input means has approached within a certain range if it is determined that the input means has approached within the certain range.

Determining whether the input means is approaching the touch control device may include determining whether the information about capacitance received by the receiver meets a third threshold.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Embodiments of the present disclosure will now be described with reference to the accompanying drawings.

The following description is provided to assist in a comprehensive understanding of exemplary embodiments of the disclosure as defined by the claims and their equivalents. It includes various specific details to assist in that understanding, but these details are to be regarded as merely exemplary. Accordingly, those of ordinary skill in the art will recognize that various changes and modifications of the embodiments described herein can be made without departing from the scope and spirit of the disclosure.

A touch control device is a means for receiving signals by touch or contact (or proximity) of an input means, such as a finger of the user or a touch pen, and determining a position of the touch (or proximity). A touch control device in accordance with embodiments of the present disclosure may be implemented to have buttons or switches.

A structure of a touch control device 10 will now be described in connection with FIGS. 1 to 3.

Figure 1:
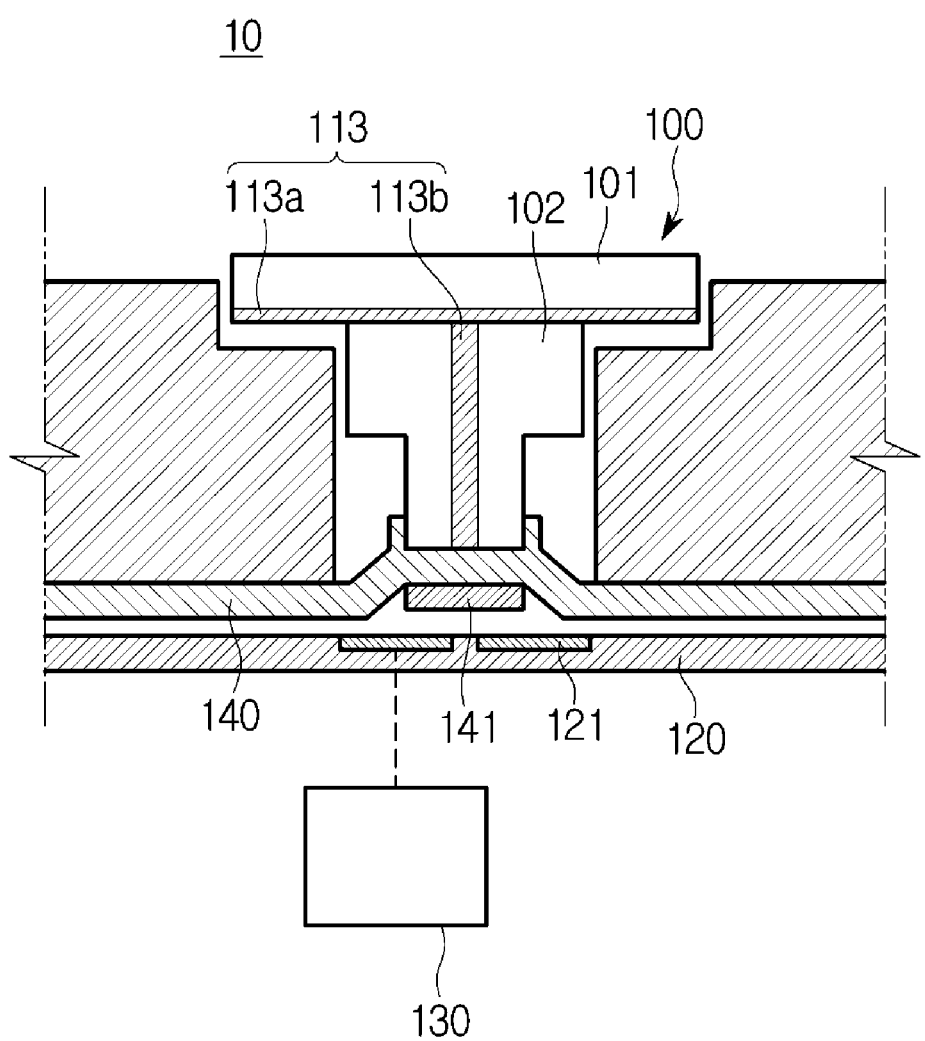
FIG. 1 is a cross-sectional view illustrating a part of a combined touch control device according to exemplary embodiments of the present disclosure.
Figure 2:
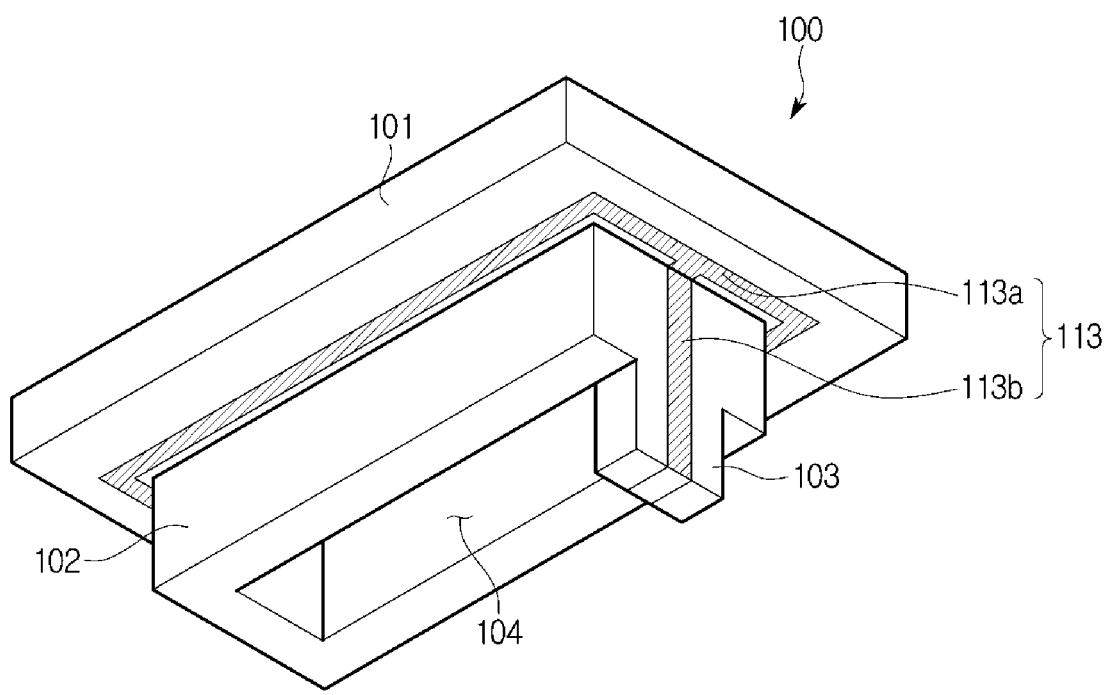
FIG. 2 is a perspective view of a button according to exemplary embodiments of the present disclosure.

FIG. 1 is a cross-sectional view illustrating a part of the combined touch control device 10, according to exemplary embodiments of the present disclosure, and FIG. 2 is a perspective view of a button 100 according to exemplary embodiments of the present disclosure. FIG. 3 is a cross-sectional view for explaining how a signal deliverer 113 is formed in the button 100.

Referring to FIG. 1, the touch input device 10 may include the button 100, the signal deliverer 113 formed in the button 100 for detecting contact of an input means, a substrate 120 equipped with a receiver 121 for receiving signals from the signal deliverer 113, an elastic member 140 arranged between the substrate 120 and the button 100, and a controller 130 for receiving information about capacitance between the signal deliverer 113 and the receiver 121, and determining input information.

Referring to FIG. 2, the button 100 may include a touch unit 101 with which an input means comes into contact, and a connector 102 extending from the touch unit 101 toward the substrate 120.

The input means herein may include a finger of the user, a touch pen or the like. Contact (or touch) may be defined herein to imply both direct contact and indirect contact. Specifically, direct contact means an event when the input means touches the touch control device 10, and indirect contact means an event when the input means approaches into a range in which the controller 130 is able to detect an object although not touching the input control device 10.

The touch unit 101 has a top face exposed to the outside of a mounting face for the input means to come into contact with, and a bottom face hidden inside the mounting face. The touch unit 101 may be shaped like a rectangle as shown in the drawings, or in any other form such as a circular or bar form.

Although the top and bottom faces of the touch unit 101 are shown as being flat in the drawings, they may be convexly or concavely curved in some embodiments. The curved face of the touch input 101 may have a constant or a changing curvature. The curved face of the touch input 101 may include two or more curvatures, and/or different curved directions depending on coordinates.

Alternatively, the top and bottom faces of the touch unit 101 may be inclined.

The connector 102 is formed to extend from the bottom face of the touch unit 101 in a downward direction. The connector 102 may include a joint 103 to join the receiver 121 of the substrate 120, and a cavity 104 concavely formed from the bottom toward the top.

The joint 103 may be formed by being further extended from the connector 102 in a downward direction. The joint 103 may be positioned to correspond to the receiver 121 of the substrate 120 in a vertical direction.

The cavity 104 may form a space into which a light source may be inserted. The light source may use, for example, a Light Emitting Diode (LED) to illuminate the button 100. For this, the button 100 may be formed of a translucent or transparent material.

The signal deliverer 113 may be formed to have a capacitance that changes when the input means approaches or touches the touch control device 10.

The signal deliverer 113 may include a first signal deliverer 113 installed in the touch unit 101 and a second signal deliverer 113 installed in the connector 102.

The first signal deliverer 113 may occupy a large area in the bottom face of the touch unit 101. The size of a touch area through which a signal is input from the input means may be determined depending on the size of the area of the first signal deliverer 113. For this, the first signal deliverer 113 may be formed to enclose the outer sides of a part to which the connector 102 is connected. For example, the first signal deliverer 113 may have the form of a rectangular band that encloses the outer sides of the connector 102 of a square pillar form.

The second signal deliverer 113 may extend downward along the lateral side of the connector 102. One end of the second signal deliverer 113 may be connected to the first signal deliverer 113, and another end of the second signal deliverer 113 may pass the lateral side of the joint 103 and may be connected to the bottom of the joint 103. This is because the bottom of the joint 103 is located in close proximity to the receiver 121 of the substrate 120.

Figure 3:
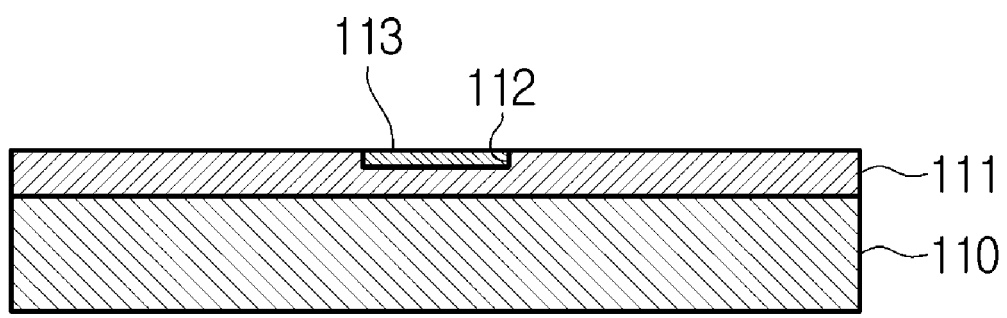
FIG. 3 is a cross-sectional view for explaining how a signal deliverer is formed in a button according to exemplary embodiments of the present disclosure.

Referring to FIG. 3, the signal deliverer 113 may be arranged in an electrode groove 112 formed in the button 100.

The button 100 may include a basic member 110, a base 111 coated on one side of the basic member 110 and the electrode groove 112 concavely formed on one side of the base 111.

The signal deliverer 113 may be formed on the base 111 using a Laser Directing Structure (LDS) method. The LDS method refers to a method of forming a conductive structure in a region of a supporter exposed to a laser by forming the supporter with a material including a non-conductive and chemically stable metal complex, exposing a metal seed by exposing a portion of the supporter to laser, such as Ultra Violet (UV) laser or excimer laser to break chemical bonding of the metal complex, and metalizing the supporter. The LDS method is disclosed in Korean Patent No. 374667, and Korean Patent Publication Nos. 2001-40872 and 2004-21614, which are incorporated herein by reference.

The signal deliverer 113 is formed of a conductive material, e.g., a metal. Particularly, the signal deliverer 113 may use copper (Cu) taking into account conductivity and economical efficiency. In another example, the signal deliverer 113 may be formed of other metals than copper, such as gold.

The base 111 may include a metal complex. For example, the base 111 may be a complex including resin and metal oxide. The resin may include one or more of Polycarbonate (PC), Polyamide (PA), and acrylonitrile-butadiene-styrene copolymer (ABS), and the metal oxide may include one or more of Mg, Cr, Cu, Ba, Fe, Ti and Al.

Alternatively, unlike what is shown in the drawings, the base 111 may be integrally formed with the basic member 110. In this case, the basic member 110 may include a metal complex.

The electric groove 112 for receiving the signal deliverer 113 is formed on one side of the base 111. That is, the signal deliverer 113 may be formed inside the electric groove 112.

The electric groove 112 is formed by irradiating a laser on the one side of the base 111. In this case, the base 111 is reduced to the metal by heat generated while the groove is formed, and the portion reduced to the metal forms a metal seed in the electric groove 112.

The signal deliverer 113 is formed by being plated on the electric groove 112. A plating process on the metal seed may use a common technology known to the public, so the details will be omitted herein. Alternatively, the signal deliverer 113 may be formed by a deposition process. In another example, the signal deliverer 113 may also be formed by a combination of the plating and deposition processes. In the following description, it is assumed that the signal deliverer 113 is formed by the plating process.

The signal deliverer 113 may include copper plating, and may further include plating the copper plating with nickel (Ni) to prevent oxidization. Meanwhile, gold plating may improve conductivity.

The base 111 may be formed by being coated on one side of the basic member 110 formed of any of various materials. The basic member 110 may include resin, glass or leather. The basic member 110 may have stiff or elastic surfaces. Furthermore, the basic member 110 may be rigid or flexible. The basic member 110 may be formed through an injection molding method. For example, the basic member 110 may be formed in any shape through injection, and the base 111 including a metal oxide may be coated on the top or the bottom of the basic member 110.

As described above, the touch unit 101 is curvedly formed. In this case, the first signal deliverer 113 may be curved depending on the curvature of the touch face.

The base 111 may include a curved face depending on the shape of the basic member 110. For example, a face of the base 111 may have a partially spherical form. The electric groove 112 may be formed on the curved face of the base 111. In this regard, since the electric groove 112 is formed using a laser, the electric groove 112 may have a complicated form regardless of the shape of the base 111.

The signal deliverer 113 is plated on the electric groove 112. In this regard, by nature of the plating process, the signal deliverer 113 may be plated regardless of the shape of the electric groove 112, which makes it easy to plate the signal deliverer 113 even if the electric groove 112 is not formed to be straight or planar.

Next, a process for forming the signal deliverer 113 will be described.

The base 111 may be formed in an injection molding method. The base 111 may be formed by injecting a metal complex, or by coating a metal complex on one face of a material, such as resin, glass or leather.

The electric groove 112 is formed by irradiating a laser, such as UV laser or excimer laser onto one face of the base 111. In this case, the heat generated while the groove is formed breaks the chemical bonding of the metal complex to be reduced to a metal, forming a metal seed in the electric groove 112.

The electric groove 112 may be formed on a curved face of the base 111. Since the groove is formed by laser irradiation, various patterns may be made without regard to the surface form of the base 111.

The signal deliverer 113 may be formed by metalizing the electric groove 112 that exposes the metal seed. The metalization process may be based on plating or deposition.

On the substrate 120, the receiver 121 and various circuits may be formed. For example, the substrate 120 may be a Printed Circuit Board (PCB).

The receiver 121 may be formed of a conductive material, e.g., a metal. Especially, the receiver 121 may use copper taking into account conductivity and economical efficiency. In another example, the receiver 121 may be formed of other metals than copper, such as gold.

The receiver 121 may be formed to have changing capacitance between the receiver 121 and the signal deliverer 113. In other words, the capacitance may be changed as the distance between the receiver 121 and the signal deliverer 113 is changed according to an upward or downward movement of the button 100.

Information about the capacitance between the receiver 121 and the signal deliverer 113 may be sent to the controller 130 connected to the receiver 121. The controller 130 will further be described below.

The receiver 121 may be formed in an LDS method. For example, the base 111 including a metal complex may be coated on one side of the substrate 120, or alternatively, the substrate 120 may include the metal complex. A groove in which the receiver 121 is to be formed may then be formed using a laser. The receiver 121 may then be formed through plating or deposition.

The elastic member 140 may be arranged between the button 100 and the substrate 120. The elastic member 140 may be formed to support the button 100 and may provide repulsive force while being elastically deformed as the button 100 is moved down by an external force. When the external force is relieved, the elastic member 140 is restored to its original form and the button 100 is moved to its original position.

The elastic member 140 may be arranged to support the joint 103 of the button 100. For example, the elastic member 140 may have a pillar form to support the joint 103 of the button 100, and a lateral side of the elastic member 140 may be inclined to be always easily deformed.

The top of the elastic member 140 may be concaved to receive the joint 103 of the button 100. For example, if the cross-section of the joint 103 has a rectangular form, a rectangular groove is formed on the top of the elastic member 140 for the joint 103 to be inserted thereto.

The elastic member 140 is formed to cover the substrate 120, thus performing anti-soil, anti-dust and waterproof functions. For example, the elastic member 140 may be a rubber member to cover the substrate 120. The elastic member 140 may protect the substrate 120 against foreign materials that might come into gaps around the button 100, thereby preventing malfunctions.

The elastic member 140 may generally have the form of a wide plate or a film, and have a deformable portion that supports the button 100.

A resistive member 141 may be attached onto the bottom of the elastic member 140. The resistive member 141 may be formed of a conductive material, e.g., a metal.

The resistive member 141 may be located in a position to correspond to the receiver 121. When the button 100 is moved down by an external force, the elastic member 140 is elastically deformed and comes into contact with the receiver 121. When the external force is relieved, the elastic member 140 is restored to its original form and the resistive member 141 is detached from the receiver 121.

The resistive member 141 may perform On/Off functions of the touch control device 10.

When the resistive member 141 comes into contact with the receiver 121, a current or voltage at the receiver 121 may be changed. The controller 130 may determine from the change in current or voltage at the receiver 121 whether the resistive member 141 comes into contact with the receiver 121. Specifically, the controller 130 may determine that the touch control device 10 is in the On state when the resistive member 141 contacts the receiver 121, and determine that the touch control device 10 is in the Off state when the resistive member 141 is detached from the receiver 121.

There may be a plurality of receivers 121 separated from one another. In this case, if the resistive member 141 simultaneously comes into contact with the receivers 121 separated from one another, a current may flow in the receivers 121. The controller 130 may determine whether the resistive member 141 comes into contact with the receivers 121, based on whether a current flows in the receivers 121. Specifically, the controller 130 may determine that the touch control device 10 is in the On state when the resistive member 141 contacts the receivers 121, and determine that the touch control device 10 is in the Off state when the resistive member 141 is detached from the receivers 121.

Figure 4:
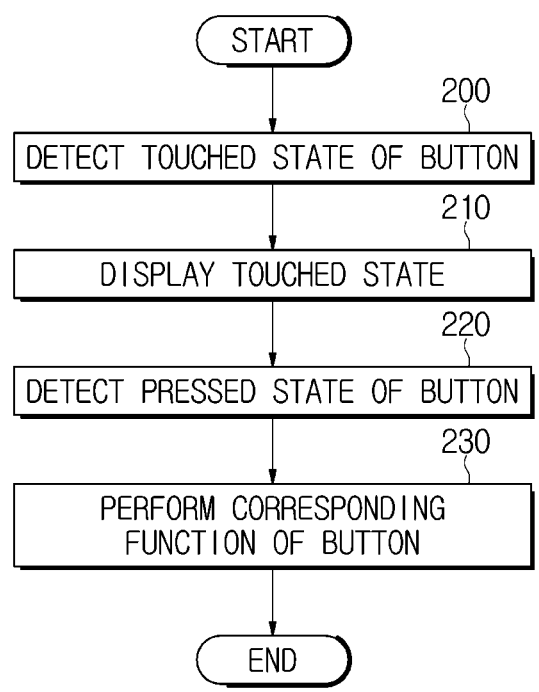
FIG. 4 is a flowchart illustrating a method for controlling a touch control device according to exemplary embodiments of the present disclosure.

FIG. 4 is a flowchart illustrating a method for controlling the touch control device 10, according to exemplary embodiments of the present disclosure.

Referring to FIG. 4, if an input means, such as a finger of the user or a touch pen touches the button 100, capacitance between the signal deliverer 113 and the receiver 121 is changed. Information about the change of capacitance is then delivered to the controller 130 connected to the receiver 121, and the controller 130 determines that the input means is in contact with the button 100, in operation 200.

If the received information about the change of capacitance is in a first capacitance range stored, the controller 130 determines that the input means comes into contact with the button 100, and displays the touched state, in operation 210. For example, the controller 130 may display the touched state by displaying an icon on a display or a Head Up Display (HUD) or by providing an alarm in a voice message.

Furthermore, when the input means presses the button 100 with an external force, the capacitance between the signal deliverer 113 and the receiver 121 is changed. Information about the change of capacitance is then delivered to the controller 130 connected to the receiver 121, and the controller 130 determines that the input means presses and holds the button 100, in operation 220.

If the received information about the change of capacitance is in a second capacitance range stored, the controller 130 determines that the input means presses the button 100, and performs a corresponding function of the button 100, in operation 230.

Two methods may be used for the controller 130 to determine whether the button 100 is pressed. The first method is to determine that the button 100 is pressed based on a change in current or voltage that occurs when the resistive member 141 comes into contact with the receiver 121, and the second method is to determine that the button 100 is pressed based on a change in capacitance. In this regard, the capacitance between the signal deliverer 113 and the receiver 121 may have a smaller value than in the touched state.

The control method may prevent malfunctions from unintentional touches. In a case where the user is not familiar to the function of the button 100, the function of the button 100 may be displayed. For example, if the input means touches the button 100, the function of the button 100 may be displayed on a display or HUD, or may be informed through a voice message. When the input means presses the button 100 after that, it is interpreted that the user is aware of the function of the button 100, and thus the function of the button 100 may be performed.

Figure 5:
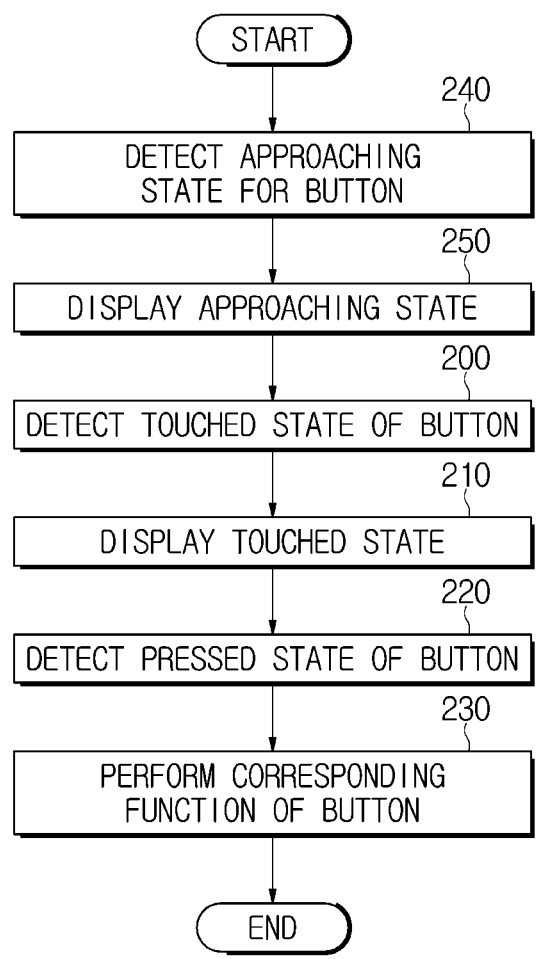
FIG. 5 is a flowchart illustrating a method for controlling a touch control device according to exemplary embodiments of the present disclosure.

FIG. 5 is a flowchart illustrating a method for controlling the touch control device 10, according to some embodiments of the present disclosure.

Referring to FIG. 5, if an input means, such as a finger of the user or a touch pen approaches the button 100 in operation 240, capacitance between the signal deliverer 113 and the receiver 121 is changed. Information about the change of capacitance is then delivered to the controller 130 connected to the receiver 121, and the controller 130 determines that the input means approaches the button 100, in operation 240.

If the received information about the change of capacitance is in a third capacitance range stored, the controller 130 determines that the input means is located in a range close to the button 100, and displays the approaching state for the user, in operation 250. For example, the controller 130 may display the approaching state by displaying an icon on a display or an HUD or by providing an alarm in a voice message. In this regard, the capacitance between the signal deliverer 113 and the receiver 121 may have a larger value than in the touched state.

Furthermore, when the input means touches the button 100, the capacitance between the signal deliverer 113 and the receiver 121 is changed. Information about the change of capacitance is then delivered to the controller 130 connected to the receiver 121, and the controller 130 determines that the input means is in contact with the button 100, in operation 200.

If the received information about the change of capacitance is in a first capacitance range stored, the controller 130 determines that the input means comes into contact with the button 100, and displays the touched state, in operation 210. For example, the controller 130 may display the touched state by displaying an icon on a display or an HUD or by providing an alarm in a voice message.

Furthermore, when the input means presses the button 100 by applying an external force, the capacitance between the signal deliverer 113 and the receiver 121 is changed. Information about the change of capacitance is then delivered to the controller 130 connected to the receiver 121, and the controller 130 determines that the input means presses and holds the button 100, in operation 220.

If the received information about the change of capacitance is in a second capacitance range stored, the controller 130 determines that the input means presses the button 100, and performs a function of the button 100, in operation 230.

Figure 6:
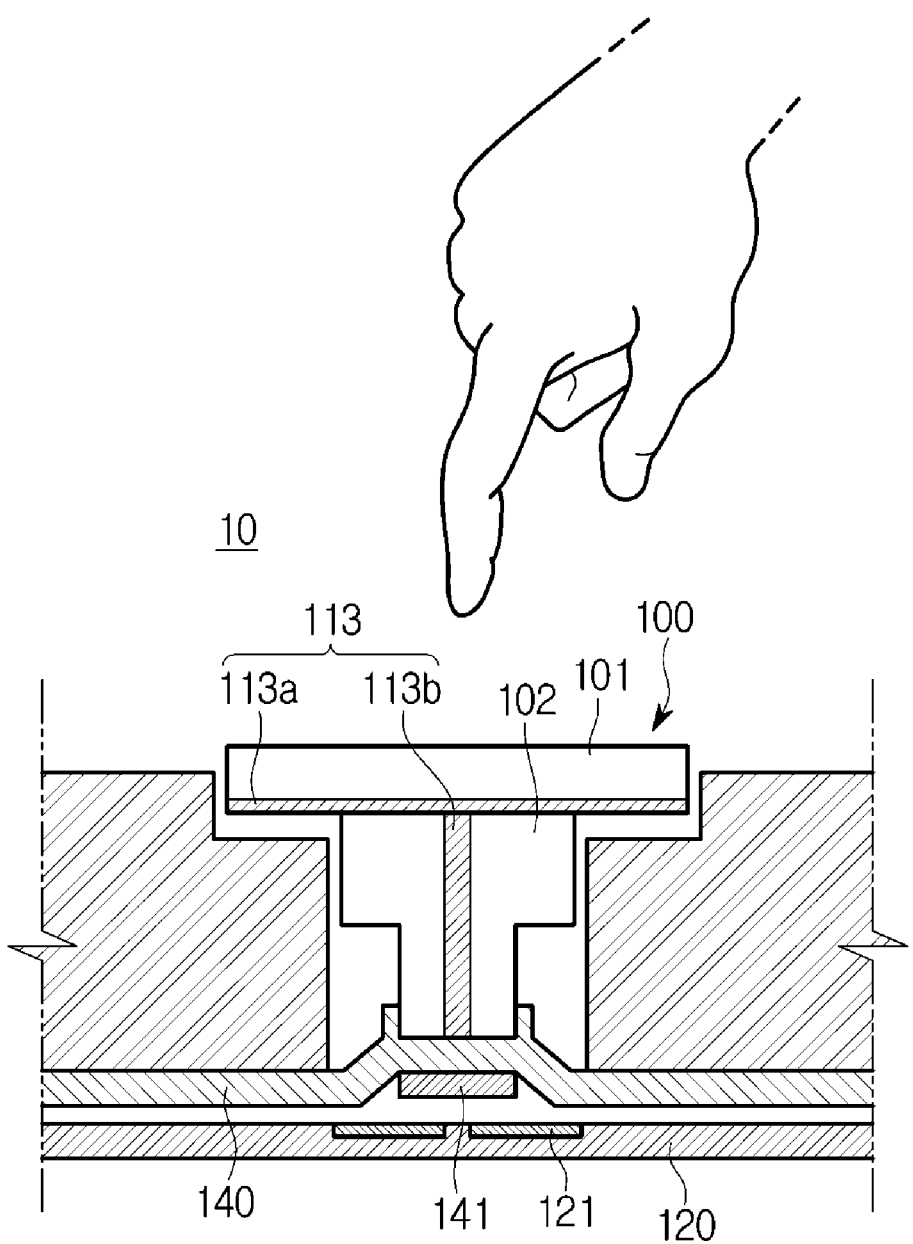
FIG. 6 illustrates a finger of a user approaching a touch control device according to exemplary embodiments of the present disclosure.

Next, how the touch control device 10 operates will now be described in connection with FIGS. 6 to 8. FIG. 6 illustrates a finger of the user approaching the touch control device 10 according to exemplary embodiments of the present disclosure, FIG. 7 illustrates a finger of the user coming into contact with the touch control device 10 according to exemplary embodiments of the present disclosure, and FIG. 8 illustrates a user pressing and holding the touch control device 10 according to exemplary embodiments of the present disclosure.

FIG. 6 illustrates the input means approaching within a certain distance to the touch unit 101. Even with the input means approaching within the certain distance before coming into contact with the touch unit 101, the capacitance between the signal deliverer 113 and the receiver 121 is changed. The controller 130 may determine that the input means approaches the touch unit 101 if the capacitance is changed in the first range.

Figure 7:
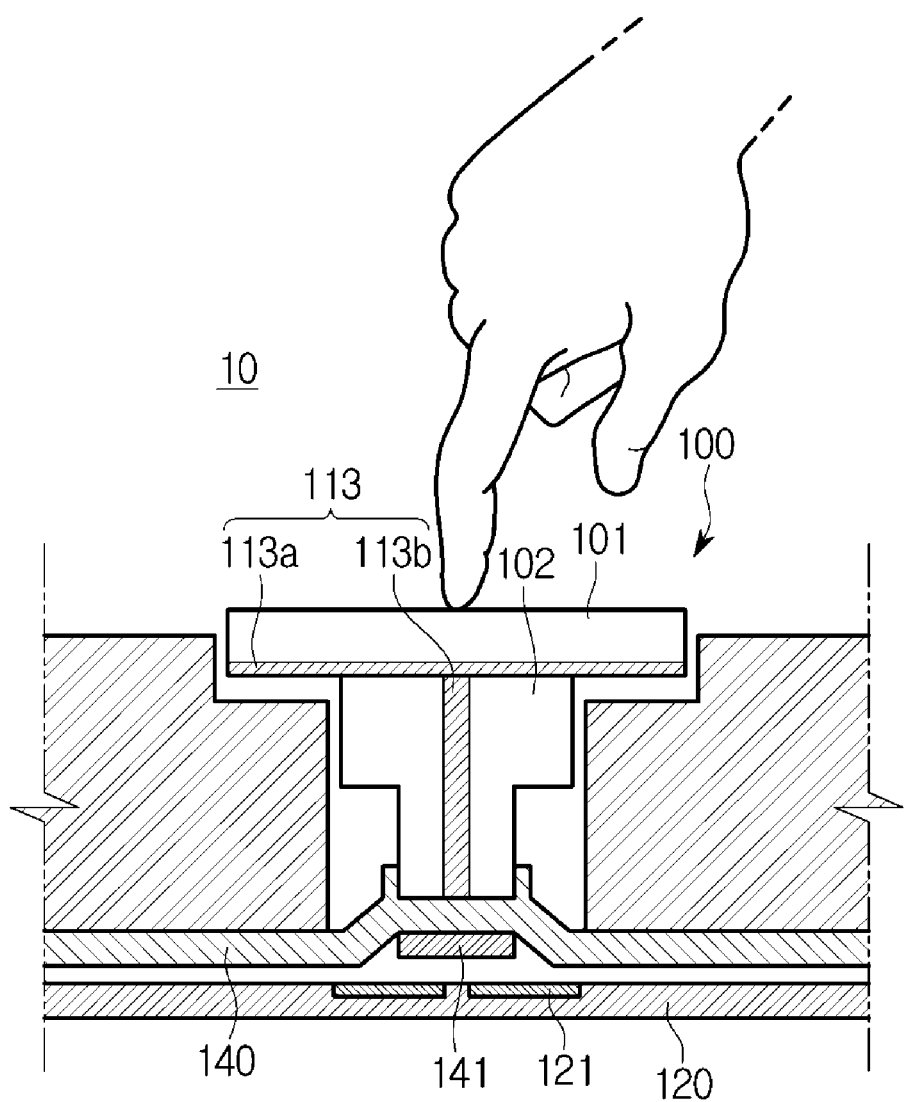
FIG. 7 illustrates a finger of a user coming into contact with a touch control device according to exemplary embodiments of the present disclosure.

FIG. 7 illustrates the input means touching the touch unit 101. The controller 130 may determine that the input means comes into contact with the touch unit 101 if the capacitance is changed in the second range.

Figure 8:
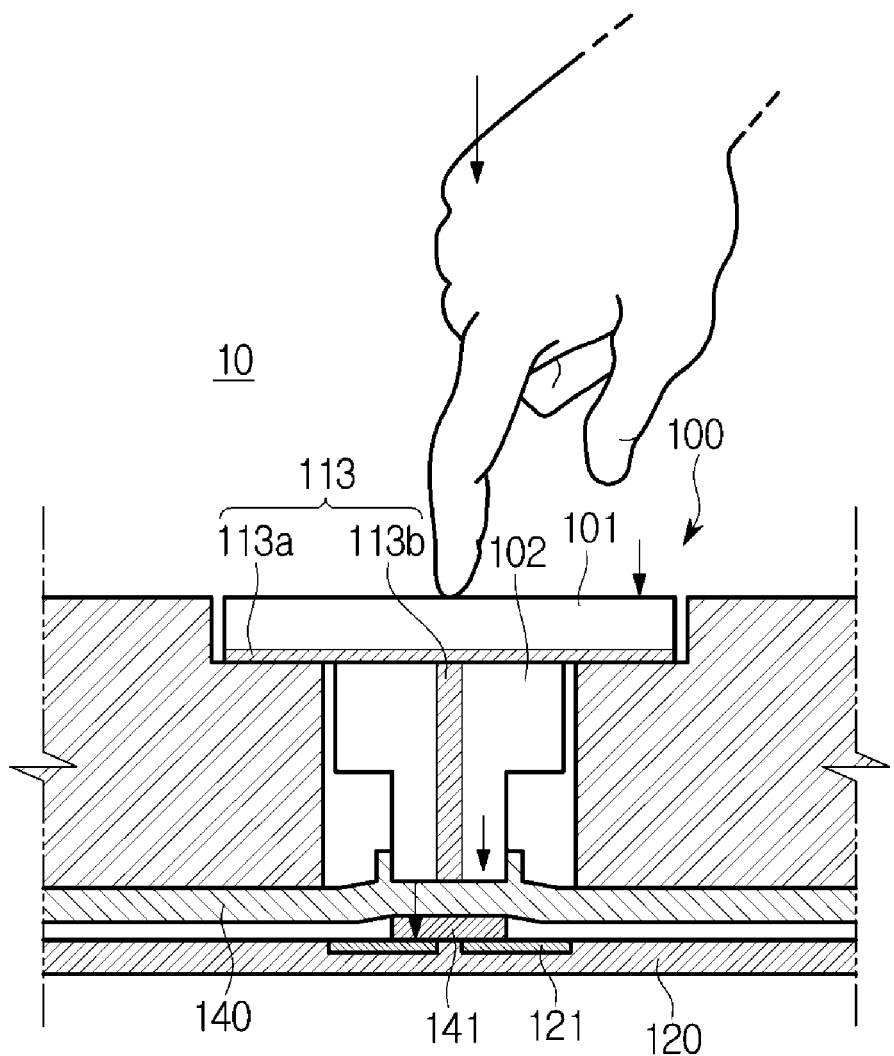
FIG. 8 illustrates a user pressing and holding a touch control device according to exemplary embodiments of the present disclosure.

FIG. 8 illustrates the button 100 pressed by an external force applied by the input means. The controller 130 may determine that the button 100 has been pressed if the capacitance is in the third range.

Figure 9:
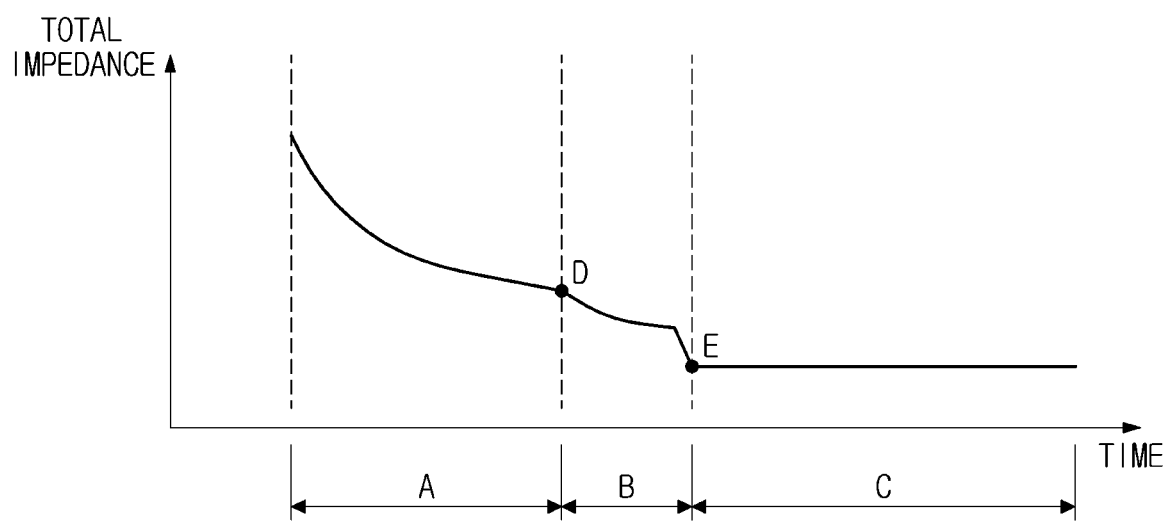
FIG. 9 is a graph representing impedance changed in the process of FIGS. 6 to 8.

FIG. 9 is a graph representing impedance changing in the process of FIGS. 6 to 8 according to exemplary embodiments of the present disclosure.

The y-axis represents total impedance and the x-axis represents changes in time.

Section A represents a state in which the input means approaches the touch unit 101, approaching closer to the touch unit 101 as time goes by (to the right on the x-axis). The closer the input means approaches to the touch unit 101, the smaller the total impedance becomes.

Section B represents a state in which the input means comes into contact with the touch unit 101, and the extent to which the button 100 is pressed becomes larger as time goes by (to the right on the x-axis). The larger the extent to which the button 100 is pressed, i.e., the closer the signal deliverer 113 approaches to the receiver 121, the smaller the total impedance becomes.

Point D, a border between the sections A and B, represents a moment when the input means comes into contact with the touch unit 101.

Section C represents a state in which the button 100 is fully pressed, and the total impedance is not changed with time.

Point E, a border between the sections B and C, represents a moment when the resistive member 141 comes into contact with the receiver 121.

The touch control device according to embodiments of the present disclosure may be manufactured using an LDS method, thereby simplifying the manufacturing process and reducing processing costs.

Such a method also makes it easy to form sensing patterns even when a touch unit is curvedly formed. Especially, even when the touch unit is formed to have double curvature, the sensing patterns may be formed.

Also, the touch control device may be safe from vibration and shock and may have improved durability, by not using any adhesion process in forming the sensing patterns on a base.

Moreover, since the touch control device is manufactured under a high heat condition using a laser, it may have improved reliability even when the product of the touch control device is used in high-temperature environments.

Furthermore, the touch control device may provide feelings of manipulation for the user by adding physical buttons to touch buttons.

In addition, the touch control device may provide various functions by enabling the physical and touch buttons to be used together or selectively, thereby improving user convenience.

According to embodiments of a method for controlling a touch control device, displaying whether an input means has come into contact with the touch control device may increase user convenience and enable utilization of various functions.

Displaying whether an input means has approached the touch control device may also increase user convenience and enable utilization of various functions.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A touch control device comprising: a button including a metal complex and having an electrode groove disposed therein, wherein the button comprises a touch unit with which an input means comes into contact, and a connector extending from the touch unit toward the substrate;
- a signal deliverer arranged in the electrode groove and including a conductive material, wherein the signal deliverer comprises a first signal deliverer arranged in the touch unit and a second signal deliverer arranged in the connector;
- a substrate having a receiver disposed thereon for receiving a signal from the signal deliverer, the receiver being disposed apart from the signal deliverer;
- an elastic member disposed between the button and the substrate to provide an elastic restoring force to the button and to prevent foreign matter or water from penetrating into the substrate by covering the substrate; and
- a resistance member attached to a bottom surface of the elastic member and configured to be selectively in contact with the receiver,
- wherein the touch control device is configured to determine whether the button is touched and whether the button is pushed,
- the button includes a joint extending in a pushing direction of the button, and
- a controller for receiving information about capacitance between the signal deliverer and the receiver and determining input information, wherein the controller is configured to determine whether the signal deliverer approaches the receiver within a predetermined range or comes into contact with the receiver based on the information about the capacitance between the signal deliverer and the receiver.

2. The touch control device of claim 1,
- wherein the button comprises resin including one or more of Polycarbonate (PC), Polyamide (PA) and acrylonitrile-butadiene-styrene copolymer (ABS), and metal oxide including one or more of Mg, Cr, Cu, Ba, Fe, Ti and Al.

3. The touch control device of claim 2,
- wherein the button is formed to have a base including the metal complex coated on one face of resin, glass or leather.

4. The touch control device of claim 1,
- wherein the controller is configured to determine whether an input means comes into contact with the button based on the information about the capacitance between the signal deliverer and the receiver.

5. The touch control device of claim 4,
- wherein the controller is configured to determine whether an input means approaches the button within a predetermined range based on the information about the capacitance between the signal deliverer and the receiver.

6. The touch control device of claim 1, further comprising:
- an elastic member placed between the connector and the substrate for applying elastic force to the button.

7. The touch control device of claim 1,
- wherein the first signal deliverer is formed to enclose the surrounding of a connecting part of the connector on a bottom of the touch unit, and wherein the second signal deliverer is formed to be connected to the first signal deliverer on one side and extending to a bottom of the connector along one face of the connector.

8. The touch control device of claim 1,
- wherein the button is in direct contact with at least a portion of a housing arranged between the button and the elastic member when the button is pushed.

* * * * *